Dec. 8, 1970    M. L. FIKE    3,545,101
EDUCATIONAL GAME BOARD
Filed July 29, 1968    2 Sheets-Sheet 1

| ARITHMETIC CHALLENGE | | | | | | | |
|---|---|---|---|---|---|---|---|
| A | B | C | D | E | F | G | H |
| 6 | 2 | 7 | 5 | 8 | 9 | 4 | 3 |
| 69 | 68 | 16 | 15 | 20 | 18 | 17 | 75 |
| 12 | 21 | 30 | 36 | 33 | 35 | 40 | 32 |
| 10 | 24 | 45 | 49 | 48 | 50 | 44 | 42 |
| 13 | 22 | 60 | 55 | 63 | 64 | 56 | 54 |
| 52 | 25 | 70 | 77 | 81 | 80 | 66 | 72 |
| 14 | 27 | 88 | 90 | 96 | 132 | 121 | 144 |
| 11 | 28 | 84 | 99 | 100 | 108 | 110 | 120 |

INVENTOR
MARY L. FIKE

BY  *McLean, Morton & Boustead*
ATTORNEYS

Dec. 8, 1970          M. L. FIKE          3,545,101

EDUCATIONAL GAME BOARD

Filed July 29, 1968          2 Sheets-Sheet 2

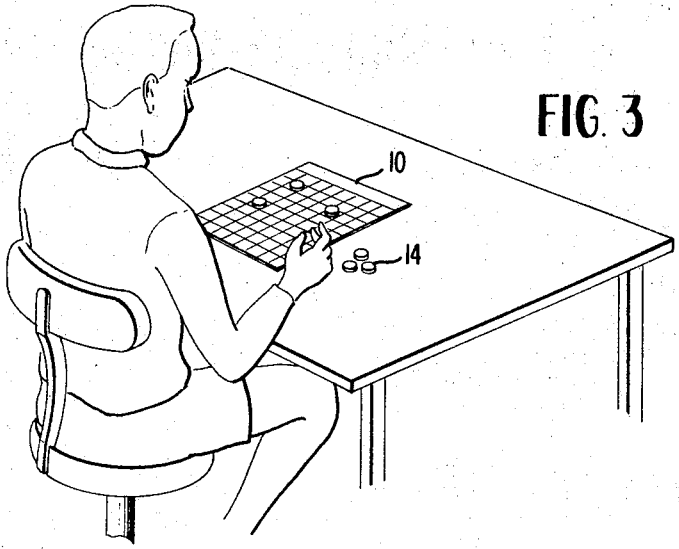

| \ | A | B | C | D | E | F | G |
|---|---|---|---|---|---|---|---|
| | IDAHO | COLORADO | NEW JERSEY | CONNECTICUT | INDIANA | MINNESOTA | NEW YORK |
| | KANSAS | ARKANSAS | SOUTH CAROLINA | DELAWARE | KENTUCKY | NEW HAMPSHIRE | MISSISSIPPI |
| | GEORGIA | PENNSYLVANIA | VERMONT | ILLINOIS | LOUISIANA | OREGON | SOUTH DAKOTA |
| | MASSACHUSETTS | WASHINGTON | NEW MEXICO | WEST VIRGINIA | IOWA | WISCONSIN | MONTANA |
| | CALIFORNIA | FLORIDA | ARIZONA | MAINE | MICHIGAN | OHIO | RHODE ISLAND |
| | WYOMING | ALASKA | MARYLAND | NEBRASKA | OKLAHOMA | MISSOURI | NORTH DAKOTA |
| | UTAH | NORTH CAROLINA | ALABAMA | VIRGINIA | TEXAS | NEVADA | TENNESSEE |
| | FLORIDA | HAWAII | GEORGIA | KANSAS | ILLINOIS | INDIANA | ARIZONA |

GEOGRAPHY CHALLENGE

United States Patent Office 3,545,101
Patented Dec. 8, 1970

3,545,101
EDUCATIONAL GAME BOARD
Mary L. Fike, Rte. 1, Box 240, Lakeland, Fla. 33803
Filed July 29, 1968, Ser. No. 748,421
Int. Cl. G09b 3/04
U.S. Cl. 35—31      4 Claims

ABSTRACT OF THE DISCLOSURE

A teaching apparatus comprising a game board having on one side a plurality of numerical answers randomly arranged in rows and columns and on the other side a plurality of word answers randomly arranged in rows and columns. An instructor calls out problems, and each student marks the answers on his game board until a complete row or a complete column of answers is marked. Since the answers are randomly arranged, the student must correctly solve the problem in order to mark the correct answer. Because each student has an identical game board, the winner is the student first correctly solving the required number of problems, with no element of chance.

---

The present invention pertains to an educational game. More particularly, the present invention pertains to a game for teaching subjects such as arithmetic and geography in which the instructor is able to give the students a large number of problems, while providing a competitive atmosphere to increase the interest of the students.

The teaching of many subjects is readily achieved by means of giving students problems related to the subjects. However, to insure complete coverage of a subject, it is a frequent practice in, for example the teaching of arithmetic, to repetitively drill the students in such things as simple addition and multiplication tables. Similarly, a number of word problems relating to such subjects as geography can be covered by means of repetitive drills. For example, the names of state capitals can be learned by simply repeating standard problems and questions, this routine manner of learning frequently causes the students to lose interest. In addition, it often permits a student to determine the correct answers by methods which do not increase his learning of the subject and which are not available to him when faced with a practical problem.

Games and similar devices have been developed to assist the learning of such subjects as arithmetic and geography. Such arithmetic games frequently utilize game boards upon which numbers appear in a pattern. Thus, for example, in one type of game board the numbers occur in a first sequence along the top edge row and in a second sequence along the left edge column. The squares defined at the intersections of the rows and columns contain the products of the corresponding top edge row and left edge column. It is accordingly possible for the student to determine an answer to a multiplication problem by simply finding the multiplier along one edge and the multiplicand along the other edge, and then locating the corresponding intersection. Thus, the student is able to determine the answer to the problem even though he exhibits no knowledge of multiplication. In addition, such game boards do not lend themselves to the teaching of addition or subtraction. Likewise, games utilized in the teaching of subjects such as geography frequently include items which enable the student to find a shortcut to the correct answer. A further shortcoming of such games is that they often involve an element of chance which frequently results in the winner not being the student who has given the greatest number of correct answers. This, of course, reduces the students' incentive to provide correct answers.

The present invention is an educational game suited to teaching such subjects as arithmetic and geography using a game board upon which correct answers are randomly distributed at the locations defined by the intersections of rows and columns and in which no element of chance is involved. As a result, the winner is determined solely by his knowledge of the subject. The game board is suited to the teaching of many types of problems. Thus, for example, if the subject is arithmetic, then the game board can be utilized for all types of arithmetic problems including addition, subtraction, multiplication, division and "story problems." Likewise, if the subject is geography, the game board can be utilized for the teaching of such characteristics as the shape, size, population, large cities, and other prominent landmarks of a state, and in addition to such related items as the dates of important events in the state's history.

In a representative example of the present invention, the game board includes a first side having a plurality of rows and columns, with a number at each location defined by the intersections of the rows and columns; and a second side similarly having a plurality of rows and columns with the word answer to a descriptive problem at each location defined by the intersections of the rows and columns. When the instructor chooses to utilize the game board in the teaching of arithmetic, he calls out an arithmetic problem, and then each student marks what he believes to be the correct answer on his game board. Because the numbers are randomly located on the game board, no shortcut is available to the students, and so they can only mark the correct answer if they in fact have correctly solved the problem. The first student to completely mark one full row or one full column is the winner of the game. Since each student has an identical game board, the winner is determined by the student who first correctly answers the necessary number of problems, with no element of chance involved.

Should the instructor choose to utilize the game board in the teaching of its other subject, he then calls out descriptive problems relating to that subject, and after each problem each student marks on his game board the word answer which he feels is correct. Again, the first student to cover completely a full row or a full column is the winner and, since all the students have identical game boards, there is no element of chance in the determination of the winner. The game board can be adapted for anyone of several subjects such as geography, history and literature.

These and other aspects and advantages of the present invention are apparent in the following detailed description and claims, particularly when considered in conjunction with the accompanying drawings. In the drawings:

FIG. 3 illustrates the manner of student participation; and

FIG. 4 depicts another embodiment of the game board

Figures 1, 2:
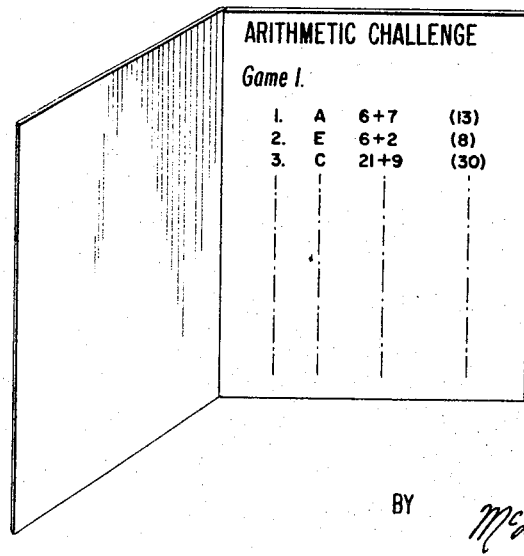
FIG. 1 depicts a first embodiment of the game board of the present invention.
FIG. 2 depicts a series of problem sets.

FIG. 1 depicts a game board 10 which is suited for the teaching of arithmetic and is designated "Arithmetic Challenge." Game board 10 includes a plurality of columns, shown in FIG. 1 as eight columns designated A through H. Game board 10 is likewise divided into eight rows. At each location defined by the intersections of the rows and columns there appears a number. Thus game board 10 includes 64 numbers. Each student has a game board 10, and the instructor likewise has a game board 10 together with a set of problems. This set of problems preferably is prepared specifically for the particular game board so that the answers to the problems appear on the game board and, after the set of problems has been read to the students, those students properly answering all of the problems will have covered one row or one column on their game board, in addition to having covered other numbers randomly located on the game board. Conveniently, as depicted in FIG. 2, a series of such problem sets of increasing difficulty might be provided the instructor in the form of a booklet 12. Alternatively, the instructor, having a game board in front of him, could make up his own problems as the game proceeds.

In a simple arithmetic game, the instructor designates the column in which an answer is to be found and then calls out the problem. Each student finding the correct answer marks it on his game board. This marking might be done by covering the answer with a token 14, as depicted in FIG. 3. Alternatively, if the game boards include a clear protective coating of a material such as a polyolefin, then the answer can be indicated by marking across it, for example, with a crayon, and after each game is completed the boards can be wiped clean. Thus, utilizing game board 10 of FIG. 1, a sample arithmetic game is as follows: A 6+7, E 6+2, C 21+9, F 6+3, H 28+4, B 1+1, A 4+2, D 9+6, C 5+2, D 3+2, A 7+5, G 2+2, C 12+4, A 7+3, H 1+2. The answers to these are, of course: 13, 8, 30, 9, 32, 2, 6, 15, 7, 5, 12, 4, 16, 10, and 3. At this point enough problems have been given to enable a student finding the correct answers to have completely marked all of the numbers in the top row of his game board, and those students who have done this so indicate by raising a hand or other means. These correct answers are A6, B2, C7, D5, E8, F9, G4, and H3. Should no student indicate that he has completely marked the row, the instructor can either continue with enough new problems to permit covering of another row or column, or he can repeat the problems already given.

As the student's skill increases, the problems can be made more difficult and various types of problems can be mixed together in a single game. Thus, for example, a more advanced arithmetic game might include the following problems: A 99÷9, D 22−7, C 9+7, H 12×6, G 8×5, A 42÷3, C 7×10, B 37−12, F 8+10, A 35+34, E 9×9, A 48÷4, F 10×8, A 54÷9, D 11×7, A 6+4, B 17×4, A 52÷4, G 9+8, A 13×4. Again, at this point enough problems have been given that a student determining the correct answers would have marked the left edge column of his game board.

For more advanced students, even more difficult problems can be utilized, including problems set out in the form of brief "stories" such as the following:

A—Three girls made 20 pieces of fudge. Sue made 7 pieces, Mary made 3 pieces. How many pieces did Alice make?

E—Grape and cherry lollipops were packed in 5 boxes of 10 each. If 30 were cherry, how many were grape?

D—If you worked 2 hours a day and received 50 cents per hour, how many days would you have to work to make $5.00?

E—A boat traveled six miles each day for four days. Throughout the entire distance it made three stops which were spaced equally apart. How many miles apart were they?

A—At 10 cents per hour, how many hours will it take to earn $1.20?

B—If you drive seventeen miles per hour for four hours, how far have you driven?

A—If a man had 132 eggs, he would have how many dozen eggs?

G—If you had 12 marbles and lost ⅔ of them, how many would you have left?

A—If you had twenty-three cats and each had two kittens, how many cats and kittens would you have?

B—If there are one-half dozen eggs in each box, how many dozen are there in four boxes?

H—If two hundred spools of thread can be bought for $16.00, how many can be bought for $6.00?

D—If you worked for three weeks, having the two day weekends off, how many days would you work?

F—How many oranges are there in ¾ dozen?

A—At 20 cents per pound, how many cents will 3/10 of a pound of candy cost?

F—If you worked one hour in the morning and one hour in the afternoon for 9 days, how many hours total would you work?

G—If you had to add Roman numerals, what would VIII plus IX equal?

H—How many inches is 1/12 of a yard?

C—If you multiply ⅓ of twelve by four, what is the answer?

The correct answers to these problems result in the second row of the game board being marked.

If the game board is designed so that there is no duplication of numbers, but instead each intersection location has a unique number in it, then to provide a greater challenge to the students, the column letter can be omitted from the problem. Thus, this single game board can be utilized to provide several types of arithmetic problems of varying difficulty to challenge the students, and the competition generated among the students helps to retain their interest in the game, particularly since there is no element of chance in the determination of the winner.

FIG. 4 depicts game board 16 which conveniently might be included as the reverse side of the board on which the game board 10 is printed. Game board 16 includes a plurality of columns, illustratively depicted as seven columns designated A through G, and a plurality of rows shown in FIG. 4 as eight rows. At each location defined by the intersections of the rows and columns the name of one of the states of the United States is printed. Thus, game board 16 can be used in the teaching of United States geography. Numerous types of questions pertaining to the geography and history of the several states can be utilized with game board 16. For example, the students might be given state capitals and be required to identify the states. A typical game then would be: E Baton Rouge, C Annapolis, G Nashville, A Cheyenne, C Montgomery, G Bismarck, D Richmond, E Oklahoma City, B Juneau, F Jefferson City, D Lincoln.

A student having all the correct answers would have by this time completely marked the row on his game board commencing in Column A with Wyoming. Similar games can be made utilizing descriptive problems covering such things as state flowers, state birds, prominent geographical features such as large rivers or mountains, rank in area, order in which admitted to the Union, and largest city. Again, a single game can include a mixture of these types of questions. If game board 16 includes seven rows and seven columns, then each state name appears but once, and, for example, the state in which the students live can be omitted since it might be assumed that they are already familiar with its geographical features. Since in such a game board each intersection location has a unique word answer, the column letters can be omitted when the descriptive problems are given. A number of other types of game boards could be provided, for example a game board for use with descriptive problems pertaining to Presidents of the United States. Thus, although the present invention has been described with reference to the teaching of arithmetic and geography, many modifications could be made, and still the resulting game would be within the scope of the invention.

What is claimed is:

1. A teaching apparatus comprising a plurality of game boards, each game board including:
a first side having a plurality of rows and a plurality of columns, the intersections of said rows and columns defining a first plurality of locations, and numerical answers to arithmetic problems randomly located in said first plurality of locations with a unique numerical answer in each location of said first plurality of locations;

a second side having a plurality of rows and a plurality of columns, the intersections of said last named rows and columns defining a second plurality of locations; and word answers to descriptive problems randomly located in said second plurality of locations with a unique word answer in each location of said second plurality of locations; and said apparatus further comprising a problem booklet having a series of problem sets, each problem set having answers on said game board, the problem sets arranged in increasing difficulty in said problem booklet.

2. A teaching apparatus as claimed in claim 1 in which said word answers are names of geographical locations.

3. A teaching apparatus as claimed in claim 2 in which said geographical location names are names of states of the United States.

4. A teaching apparatus as claimed in claim 3 further comprising means for marking answers.

References Cited

UNITED STATES PATENTS

| | | | |
|---|---|---|---|
| 461,346 | 10/1891 | Krebs | 273—135 |
| 1,655,380 | 1/1928 | Parker | 35—31(.8)X |
| 2,769,640 | 11/1956 | Elder | 35—31(.8)X |
| 3,197,891 | 8/1965 | Pierce | 35—35(.8) |

FOREIGN PATENTS

| | | | |
|---|---|---|---|
| 824,607 | 10/1937 | France | 273—135 |

WILLIAM H. GRIEB, Primary Examiner

U.S. Cl. X.R.

35—35; 273—135